(12) United States Patent
Kurata

(10) Patent No.: US 9,027,981 B2
(45) Date of Patent: May 12, 2015

(54) RESIN PRODUCT FOR VEHICLE

(71) Applicant: Nihon Plast Co., Ltd., Shizuoka (JP)

(72) Inventor: Takenori Kurata, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/022,997

(22) Filed: Sep. 10, 2013

(65) Prior Publication Data
US 2014/0070563 A1 Mar. 13, 2014

(30) Foreign Application Priority Data

Sep. 12, 2012 (JP) .................................. 2012-200775

(51) Int. Cl.
*B62D 35/00* (2006.01)
*B29C 65/00* (2006.01)
*B29C 65/06* (2006.01)
*B29L 31/30* (2006.01)

(52) U.S. Cl.
CPC ....... *B62D 35/007* (2013.01); *B29L 2031/3058* (2013.01); *B29C 66/112* (2013.01); *B29C 66/1122* (2013.01); *B29C 66/114* (2013.01); *B29C 66/128* (2013.01); *B29C 66/21* (2013.01); *B29C 66/223* (2013.01); *B29C 66/301* (2013.01); *B29C 66/30223* (2013.01); *B29C 66/54* (2013.01); *B29C 66/545* (2013.01); *B29C 65/06* (2013.01); *B29C 65/0618* (2013.01)

(58) Field of Classification Search
CPC ................ B29C 65/06; B29C 65/0618; B29L 2031/3058

USPC ................ 156/73.1, 73.5; 296/180.1, 193.01, 296/193.03
See application file for complete search history.

(56) References Cited

U.S. PATENT DOCUMENTS

| 3,827,925 | A | | 8/1974 | Douglas | |
|---|---|---|---|---|---|
| 3,973,064 | A | * | 8/1976 | Paine | 428/60 |
| 5,540,808 | A | * | 7/1996 | Vincent et al. | 156/580.2 |
| 6,001,201 | A | * | 12/1999 | Vincent et al. | 156/73.1 |
| 6,241,836 | B1 | * | 6/2001 | Skirha et al. | 156/73.5 |
| 6,503,352 | B2 | * | 1/2003 | Nakajima et al. | 156/73.5 |
| 8,273,442 | B2 | * | 9/2012 | Sano et al. | 428/101 |
| 2012/0013147 | A1 | | 1/2012 | Ezaka | |

FOREIGN PATENT DOCUMENTS

| GB | 2 264 676 A | 9/1993 |
|---|---|---|
| JP | 2004-106765 A | 4/2004 |
| JP | 2010-208058 A | 9/2010 |

OTHER PUBLICATIONS

Search Report, GB Patent Application No. 1316211.0 mailing date Mar. 4, 2014.

* cited by examiner

*Primary Examiner* — Pinel Romain
(74) *Attorney, Agent, or Firm* — Arent Fox LLP

(57) ABSTRACT

The present invention provides a resin product for a vehicle, which can be welded, even in a shape having a part curved in a vibration direction, with a sufficient strength by means of vibration welding. A resin product 100 for a vehicle, made by welding a plurality of members 1, 2 by vibration welding is characterized in that: welded parts by vibration welding are arranged to a plurality of different surfaces 11 (11a, 11b, . . . ) discretely provided in a vibration direction Q; and a respective one of the plurality of surfaces 11 is set to fall within a predetermined angle with respect to the vibration direction Q.

5 Claims, 13 Drawing Sheets

RESIN PRODUCT FOR VEHICLE

CROSS REFERENCE TO RELATED APPLICATIONS

This application claims priority of Japanese Patent Application No. 2012-200775 filed on Sep. 12, 2012. The contents of this application are incorporated herein by reference in their entirety.

BACKGROUND OF THE INVENTION

1. Field of the Invention

The present invention relates to a resin product for a vehicle, made by welding a plurality of resin members by vibration welding.

2. Description of the Related Art

Generally, in regard to a resin product for a vehicle, produced by joining a plurality of resin members, such as, e.g., a spoiler for adjusting an airflow around a vehicle body, an art using vibration welding has been known. Welding by using vibration welding has advantages that cost reduction can be achieved by reducing steps of joining process even for a large-size resin product for vehicles and also a sufficient joint strength can be easily assured.

As a rear spoiler made by the aforementioned vibration welding, there has been known a rear spoiler shaped linearly in a vibration direction, that is joined by vibration welding performed with an outer surface of a hollow inner member being covered with an outer member (for example, Japanese Unexamined Patent Application Publication No. 2004-106765).

Furthermore, there has been such a rear spoiler that, as a jig used to hold the members by adding pressure in a vertical direction at the time of vibration welding, in addition to a first jig and a base jig both arranged in the vertical direction, an auxiliary jig is also arranged in a direction perpendicular to the vibration direction. By arranging these three jigs in the direction perpendicular to the vibration direction in this manner, even with a structure having welded portions separated into two locations in the direction perpendicular to the vibration direction, the welded portions can be individually welded by pressure applied by the jigs that are arranged with respect to the welded portions on a one-to-one basis (for example, Japanese Unexamined Patent Application Publication No. 2010-208058).

Furthermore, recently there has been a trend for a vehicle shape to have a more curved shape in terms of a design, thereby demanding a resin product for a vehicle to be shaped in accordance with such a vehicle design.

However, those disclosed in Japanese Unexamined Patent Application Publication Nos. 2004-106765 and 2010-208058 described above, are such as to produce a spoiler designed linearly in a longitudinal direction by performing vibration welding to two resin members shaped linearly in the vibration direction. That is, those are produced with no consideration for application to a resin product designed to be curved in the longitudinal direction.

Regarding the problem caused when vibration welding is performed with an inner side of a resin member thus shaped curvedly in the vibration direction being brought in abutment with another resin member, an explanation is given with reference to a schematic configuration shown in FIG. 13.

As shown in FIG. 13, in the case where two members K1, K2, shaped to have curved end portions are vibration-welded in a vibration direction Q in their longitudinal direction, an angle θ1 of a contact surface between the two members with respect to the vibration direction Q is extremely decreased at a point J1 around the center portion. This causes sufficient frictional heat by friction in the contact surface even at the time of vibration welding, so that a sufficient strength can be easily obtained.

However, in the case where the two members K1, K2 are shaped to become more curved as approaching to the end portions, an angle θ2 of the contact surface between the two members with respect to the vibration direction Q is undesirably increased at a point J2 around each end portion. This makes it difficult to cause friction in the contact surface even in an attempt to perform vibration welding in the vibration direction Q, thereby causing a problem that sufficient frictional heat cannot be obtained and also a welding strength cannot be obtained enough.

Furthermore, if a curved part is welded, screwed, or fixed using an adhesive in a separate step, the cost is undesirably increased due to the increased number of production steps and the like.

The present invention has been achieved in consideration of such circumstances, and an object thereof is to provide a resin product for a vehicle, which can be welded, even in a shape having a part curved in a vibration direction, with a sufficient strength by means of vibration welding.

SUMMARY OF THE INVENTION

In order to achieve the above-described object, a resin product for a vehicle according to the present invention is made by welding a plurality of members by vibration welding, in which welded parts by vibration welding are arranged in a plurality of different surfaces provided discretely in a vibration direction, and a respective one of the plurality of surfaces is set to fall within a predetermined angle with respect to the vibration direction.

As described above, according to the present invention, a resin product for a vehicle can be welded, even in a shape having a part curved in a vibration direction, with a sufficient strength by means of vibration welding.

DESCRIPTION OF THE PREFERRED EMBODIMENTS

Next, one embodiment in which a resin product for a vehicle according to the present invention is applied to a rear spoiler is described in detail with reference to the drawings.

First Embodiment

Figure 1:
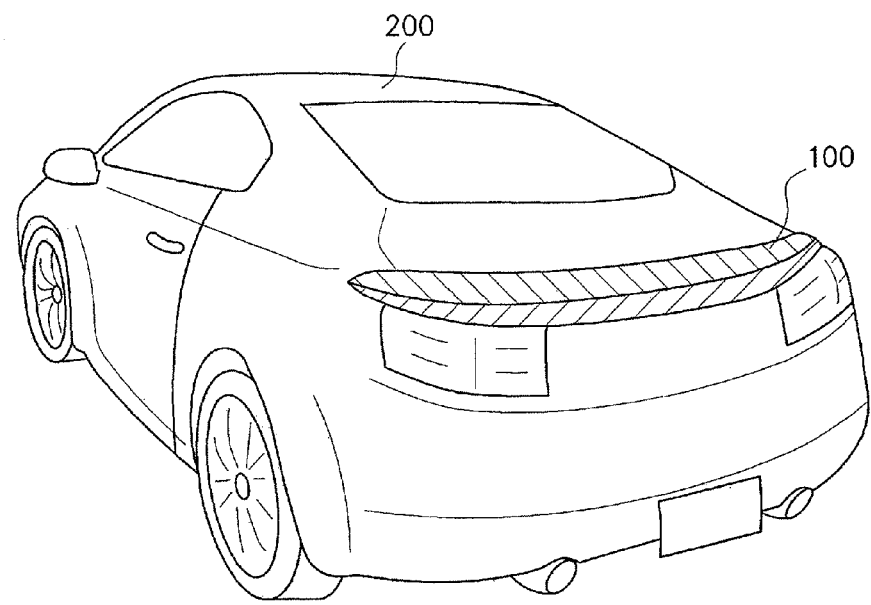
FIG. 1 is a view showing a state in which a rear spoiler 100 as a first embodiment of the present invention is mounted on a vehicle.

A rear spoiler 100 according to the present embodiment is mounted on a rear end portion of a vehicle 200, as shown in FIG. 1. Therefore, in the case where the vehicle 200 is in a round curved shape, the rear spoiler 100 follows this shape so as to be shaped curvedly in the longitudinal direction. Hereinafter, a vertical direction and a horizontal direction are explained on the basis of a vehicle traveling direction.

Figure 2:
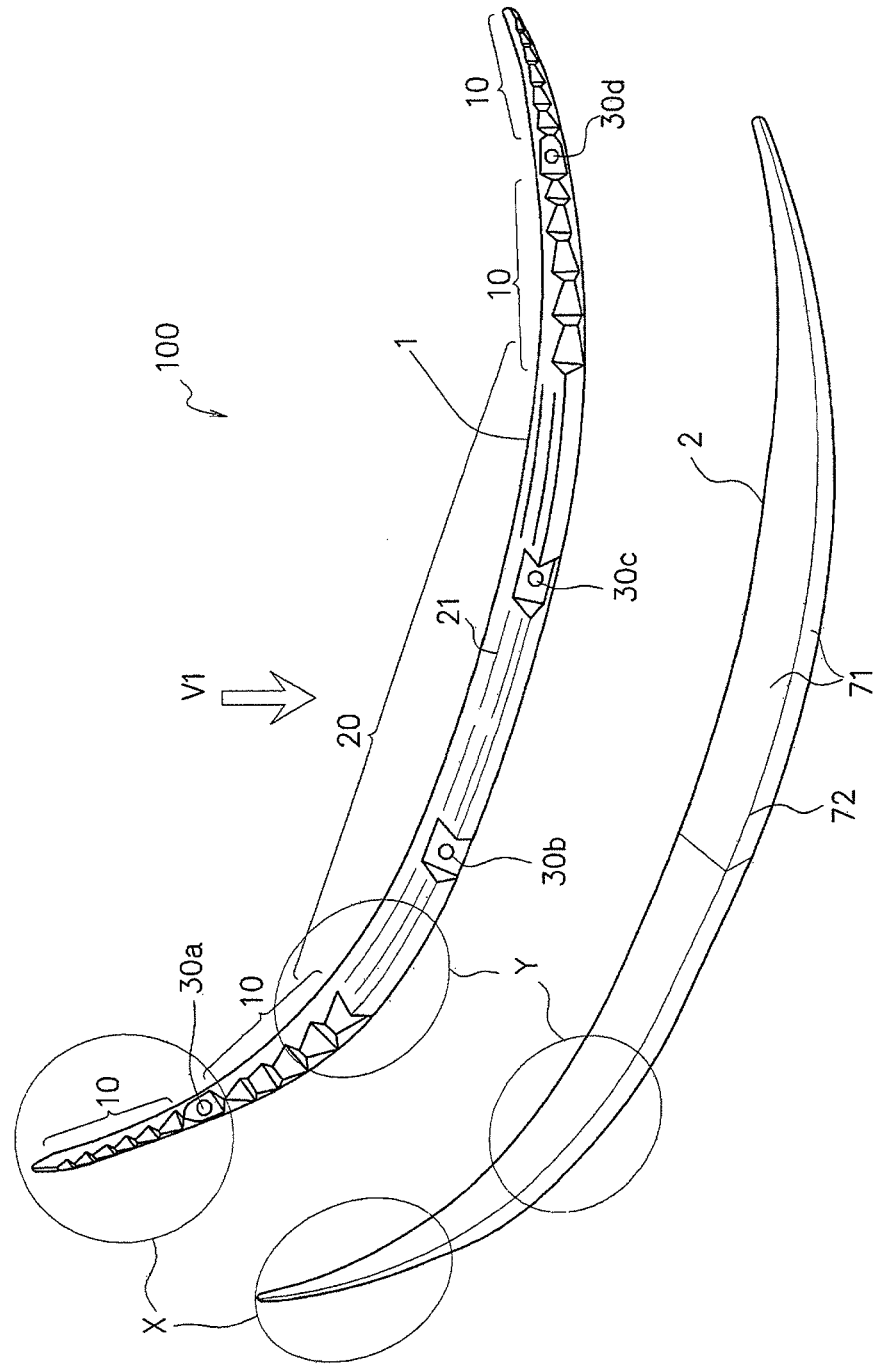
FIG. 2 is a perspective view showing an inner member 1 and an outer member 2 both making up the rear spoiler 100.

FIG. 2 illustrates an example of the rear spoiler 100 in a disassembled state. As illustrated in FIG. 2, the rear spoiler 100 includes an inner member 1 provided with a mounting holes 30 for the vehicle 200 and an outer member 2 mainly making up an appearance design part.

The inner member 1 and the outer member 2 are resin molded articles, and a molding method such as injection molding, for example, may be arbitrarily determined depending on a shape. Furthermore, as a resin and an additive agent, for example, used as a material, an arbitrary material may be adopted as long as it is suitable for vibration welding.

Figure 6:
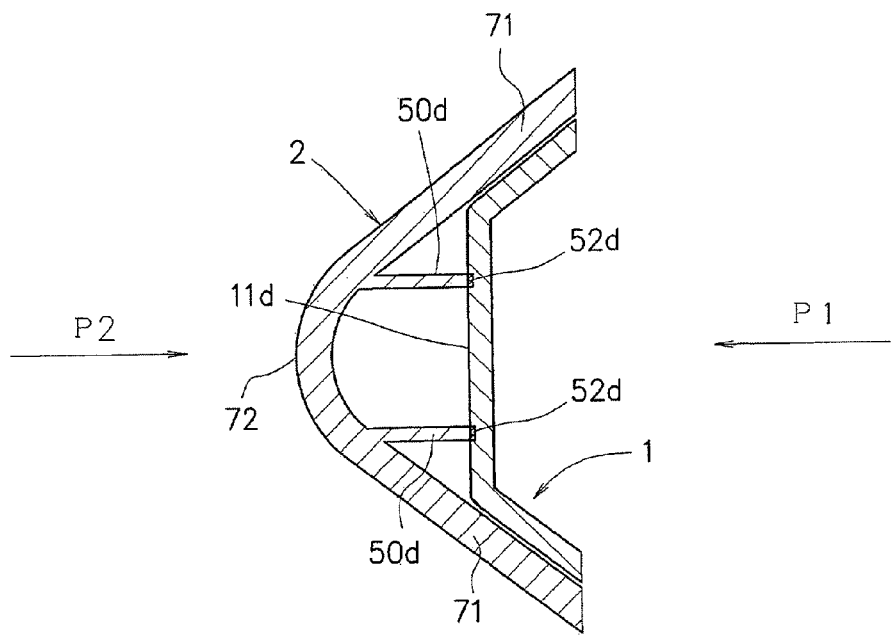
FIG. 6 is a partial cross-section view showing a cross section taken along the line D-D of FIG. 5.

The outer member 2 includes an outer wall portion 71 folded on a folding portion 72, in which a cross section in a direction perpendicular to the longitudinal direction of this outer wall portion 71 is substantially V-shaped as illustrated in FIG. 6.

The inner member 1 is shaped so as to be fitted into the inner side of the outer wall portion 71 folded in a substantially V-shape. The rear spoiler 100 is formed by performing vibration welding to the inner member 1 and the outer member 2 in a state where the inner member 1 is fitted into the inner side of the outer member 2 as described above.

In accordance with the outer shape of the vehicle 200, the rear spoiler 100 is shaped so as to become more curved in the vehicle forward direction as approaching from the center to the end portions in the horizontal direction. Furthermore, the inner member 1 is shaped so as to be fitted into the inner side of the outer member 2 shaped as described above.

Therefore, the inner member 1 is provided with a discrete-arrangement portion 10 in which welded parts by means of vibration welding are arranged in discrete surfaces in the vibration direction, and a continuous-arrangement portion 20 in which a welded part is arranged in a continuous surface. Herein, the continuous surface is defined as a surface that is continuous over a predetermined length without intervention of any folding line, and the discrete-arrangement portion 10 is a part in which a single surface having the welded part arranged therein are less continuous than a predetermined length due to intervention of a folding line or the like so as to become discrete. The discrete-arrangement portion 10 is provided to each of the curved parts around both ends in the longitudinal direction while the continuous-arrangement portion 20 is provided to the part around the center, which is not so much curved.

Figure 3:
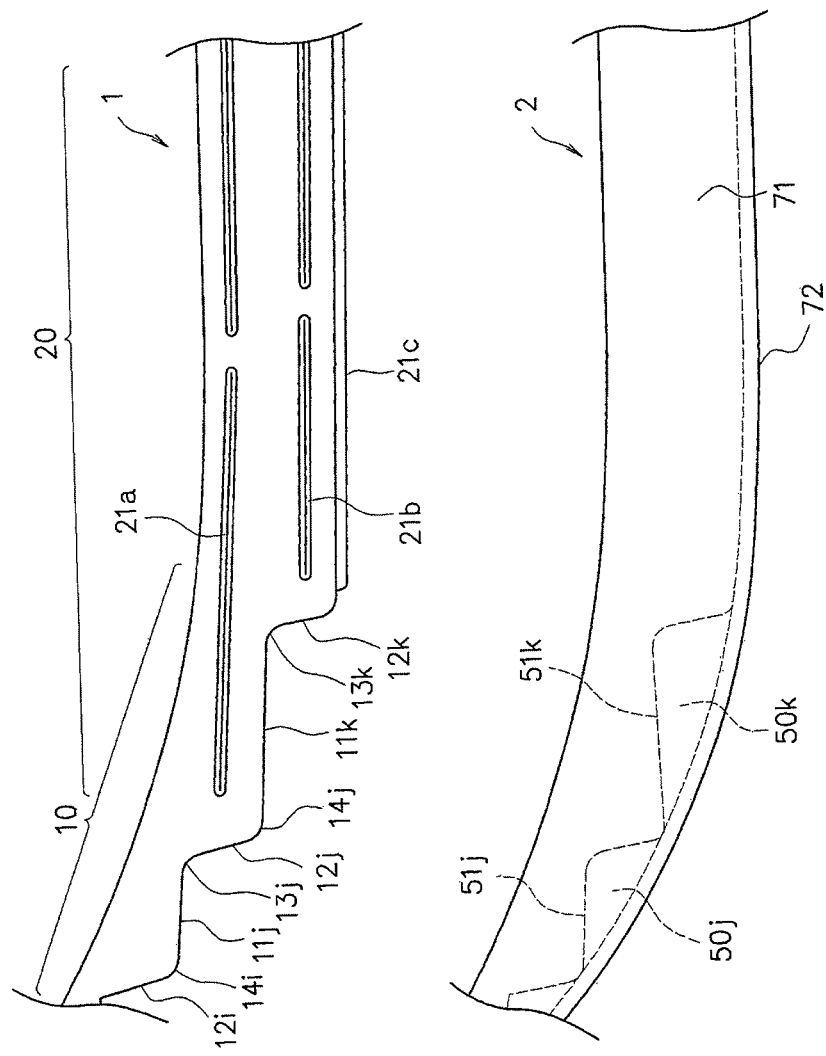
FIG. 3 is a partially enlarged view of portions Y of FIG. 2 as viewed in a direction V1.

FIG. 3 shows a partially enlarged view of portions Y of FIG. 2 as viewed in a direction V1. FIG. 4(A) is a partially enlarged view of portions X of FIG. 2 as viewed in the direction V1, and FIG. 4(B) is a partially enlarged view of the portions X as viewed in a direction V2.

As illustrated in FIG. 3, projecting portions 21 for welding, which are to be welded to the inner side of the outer wall portion 71 within the outer member 2 at the time of vibration welding, are arranged on a surface of the continuous-arrangement portion 20 within the inner member 1. In the example shown in FIG. 3, projecting portions 21a, 21b for welding are parts to be vibration-welded to the inner side at a lateral side portion of the outer wall portion 71, and a projecting portion 21c for welding is a part to be vibration-welded to the inner side of the folding portion 72 of the outer wall 71.

Figure 4:
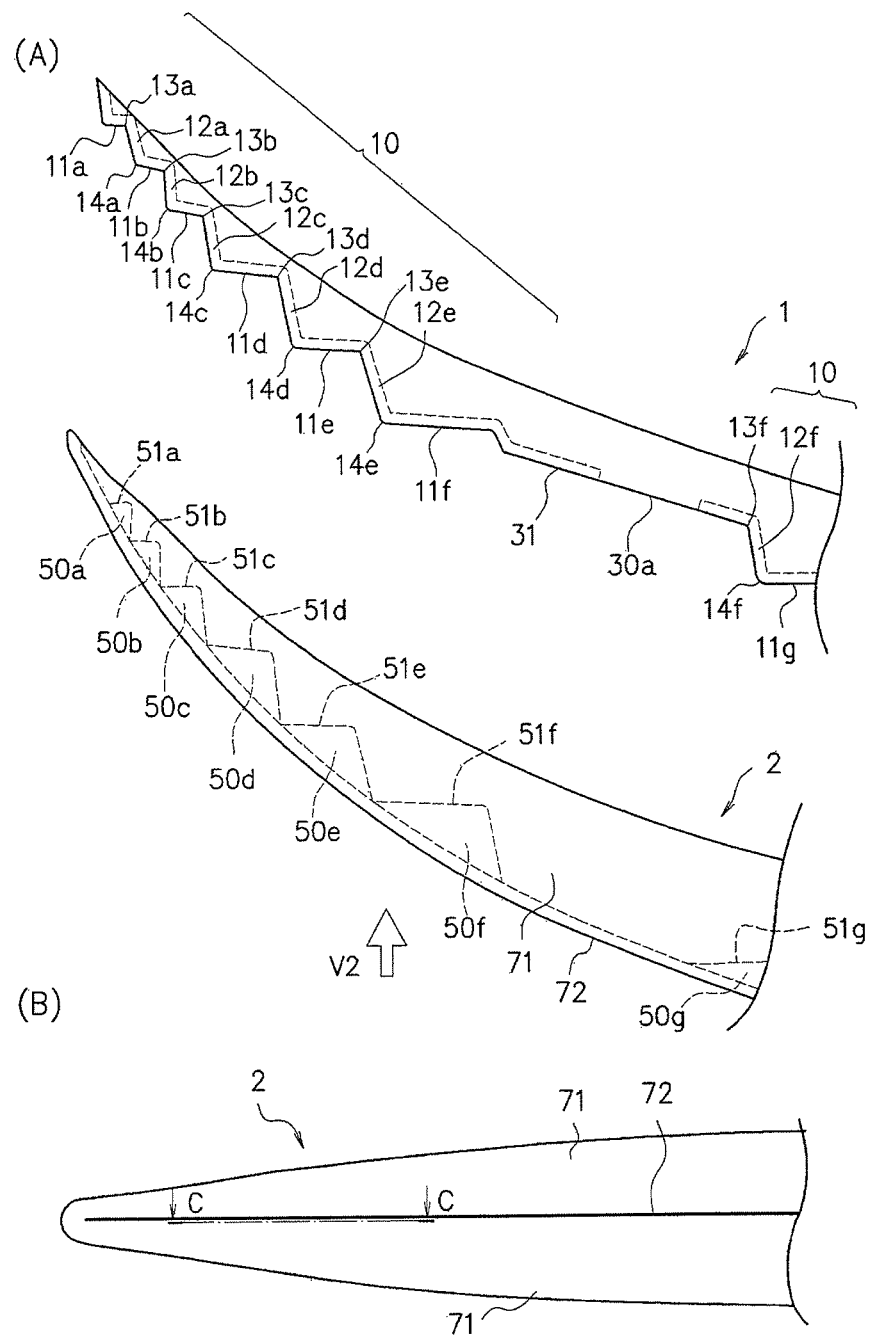
FIG. 4(A) is a partially enlarged view of portions X of FIG. 2 as viewed in the direction V1.
FIG. 4(B) is a partially enlarged view as viewed in a direction V2.

As shown in FIGS. 3 and 4, in the discrete-arrangement portion 10 within the inner member 1, abutment surfaces 11 (11a, 11b, . . . ) for arranging the welded portions by welding vibration are discretely arranged in the vibration direction. Furthermore, in the discrete-arrangement portion 10, the adjacent abutment surfaces 11 are interconnected by connecting surfaces 12, and the abutment surfaces 11 and the connecting surfaces 12 are interlinked via a folding portion 13 or 14. Therefore, the discrete-arrangement portion 10 is formed in a staircase pattern.

Herein, the folding portion 13 shows a folding line serving as a valley fold at the center side in the abutment surface 11 while the folding portion 14 shows a folding portion serving as a mountain fold at the end portion side in the abutment surface 11. The inner member 1 is shaped so as to be fitted into the inner side of the outer wall 71 folded in a substantially V-shape, so that such a shape that the folding portion 13 serves as a folding line in a wide part while the folding portion 14 is shaped like a folded vertex having little width may be acceptable.

Furthermore, ribs 50 for welding, which are to be welded to the abutment surfaces 11, are provided in a location corresponding to the discrete-arrangement portion 10 within the inner side of the outer wall portion 71 of the outer member 2. Each of the ribs 50 for welding is a flat plate that is substantially in perpendicular to the abutment surfaces 11 in a state where the inner member 1 is fitted into the outer member 2. Furthermore, as shown in FIG. 6, the ribs 50 for welding are projectingly provided to the inner side of the outer wall portion 71 so as to come in contact with the abutment surfaces 11 via the abutment distal end portions 51 at a side into which the inner member 1 is fitted.

Figure 5:
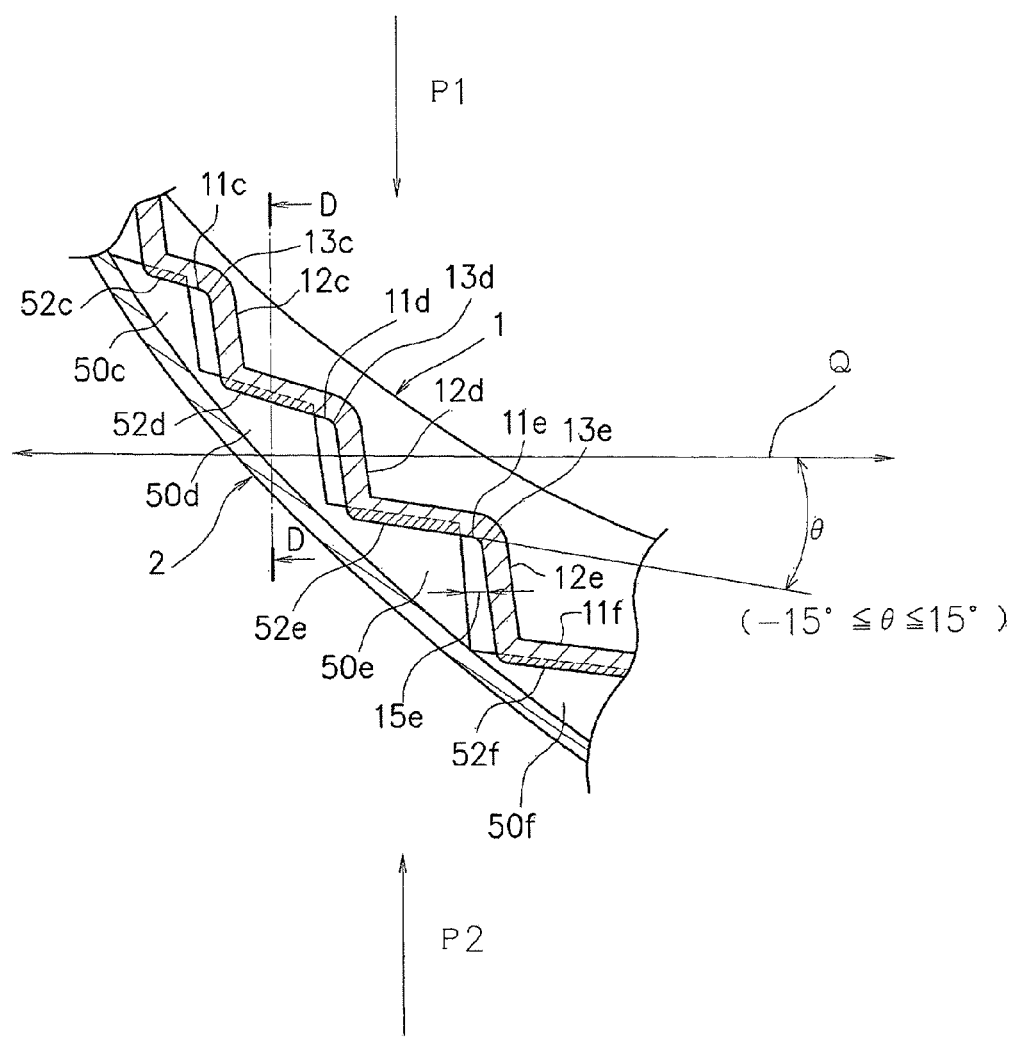
FIG. 5 is a partial cross-section view showing a cross section taken along the line C-C of FIG. 4 after vibration welding.

FIG. 5 shows a cross section taken along the line C-C of FIG. 4 after vibration welding, and FIG. 6 shows a cross section taken along the line D-D of FIG. 5. FIGS. 5 and 6 show a state in which a welded portion 52 is formed by welding the contact surface between the abutment surface 11 and the abutment distal end portion 51 of the rib 50 for welding at the time of vibration welding.

Each of the abutment surfaces 11 (11a, 11b, . . . ) is formed in a manner that an angle θ with respect to the vibration direction Q falls within a predetermined angle so that the abutment surfaces 11 can be frictionally welded to the abutment distal end portions 51 of the ribs 50 for welding with a sufficient welding strength at the time of vibration welding. In description below, explanation is given on the assumption that the maximum angle at which a sufficient welding strength can be obtained by this vibration welding falls within 15 degrees ($-15° \leq \theta \leq 15°$) with respect to each direction.

It is to be noted that each of the abutment surfaces 11 is not limited to a flat surface and may be a curved surface. In the case of a curved surface, each point on the curved surface is based on the condition that an angle θ between the tangential plane on the point and the vibration direction Q falls within 15 degrees (−15°≤θ≤15°).

At the time of performing vibration welding to the inner member 1 and the outer member 2, first, the inner member 1 and the outer member 2 are pressurized so as to be pressed against each other by means of a vibration welding device and in this state, they are vibrated in the direction perpendicular to the pressurization direction. This pressurization direction P1 is a direction in which the inner member 1 is fitted into the inner side of the outer wall portion 71 folded on the folding portion 72, and a pressurization direction P2 indicates a pressurizing force in the opposite direction to the pressurization direction P1. That is, the inner member 1 and the outer member 2 are installed on the vibration welding device so as to be oriented in the pressurization directions P1, P2.

It is to be noted that an angle between the vibration direction Q and the pressurization direction P1 is not limited to 90 degrees, and vibration welding is performable with an angle close to 90 degrees.

Furthermore, with respect to each of the connecting surfaces 12 (12a, 12b, . . . ) of the discrete-arrangement portion 10, formed in a staircase pattern, a gap 15 shown in FIG. 5 is provided between one single connecting surface 12 and the rib 50 for welding, adjacent to the connecting surface 12 in the vibration direction Q. This gap 15 is a space for assuring amplitude of vibration welding and requires at the very least half the length of amplitude at the time of vibration welding. In FIG. 5, a gap 15e between the connecting surface 12e and the rib 50e for welding is illustrated as one example.

As described above, each of parts in which the welded parts by vibration welding are to be arranged, such as each of the abutment surfaces 11 of the discrete-arrangement portion 10, is configured so that an angle θ between the tangential plane on the part and the vibration direction Q falls within 15 degrees (−15°≤θ≤15°).

Therefore, as a shape of the inner member 1 to be fitted into the inner side of the outer member 2, at a part in which an angle between the inner side of the outer wall portion 71 and the vibration direction Q falls within 15 degrees, it is preferable that the continuous-arrangement portion 20 described above be arranged to a corresponding part within the inner member 1. Shaping in this manner enables welding to be performed with a sufficient strength by vibration welding between the aforementioned continuous-arrangement portion 20 and the inner side of the outer wall portion 71.

Furthermore, as a shape of the inner member 1 to be fitted into the inner side of the outer member 2, at a part in which an angle between the inner side of the outer wall portion 71 and the vibration direction Q is larger than 15 degrees, it is preferable that the discrete-arrangement portion 10 described above be arranged to a corresponding part within the inner member 1 while the ribs 50 for welding be arranged as described above to the inner side of the outer wall portion 71. Arranging in this manner enables welding to be performed with a sufficient strength by vibration welding between the abutment surfaces 11 with an angle with respect to the vibration direction Q falling within 15 degrees, and the abutment distal end portions 51 of the ribs 50 for welding.

Therefore, even in the case where the rear spoiler 100 is shaped so as to be curved around the end portions in the longitudinal direction, it is possible to set an angle within 15 degrees (−15°≤θ≤15°), between the tangential plane and the vibration direction Q on each of parts including the curved part, in which the welded portions are to be arranged. Thus, the rear spoiler 100 including the curved parts can be vibration-welded with a stable strength.

Furthermore, since the discrete-arrangement portion 10 and the continuous-arrangement portion 20 are arranged as described above, as shown in FIGS. 2 and 3, such a shape that both are formed in the direction perpendicular to the vibration direction Q may be also applicable. The example in FIG. 3 shows a shape example in which a projecting portion 21a for welding, which is to be vibration-welded to the inner side of the outer wall portion 71 of the outer member 2, is arranged to the lateral side in which the abutment surface 11k arranged.

Furthermore, just the discrete-arrangement portion 10 and the continuous-arrangement portion 20 are required to be arranged as described above, so that a desired part can be vibration-welded with a sufficient welding strength by arbitrarily arranging the discrete-arrangement portion 10 and the continuous-arrangement portion 20 in accordance with a curved-surface shape of the outer wall portion 71 of the outer member 2.

Yet further, as shown in FIG. 2, the inner member 1 is provided with a predetermined number of mounting holes 30 for mounting the rear spoiler 100 according to the present embodiment on the vehicle 200. In the example in FIG. 2, four of the mounting holes 30a to 30d are arranged at a predetermined interval in the vibration direction, respectively.

In order to ensure that the rear spoiler 100 is fixed along the vehicle 200 up to the end portions, the mounting holes 30a, 30d shown in FIG. 2 are arranged in positions adjacent to the discrete-arrangement portions 10 at the both end parts curved in a forward direction. Even with those curved parts, as described above, the inner member 1 and the outer member 2 are welded with a sufficient strength at the discrete-arrangement portions 10.

Herein, the mounting holes 30 are provided in the inner member 1, and are required to ensure that the outer member 2 is fixed to the vehicle 200 in a state where the rear spoiler 100 is mounted on the vehicle 200. Accordingly, especially the vicinity of each of the mounting holes 30 is required to be welded with a sufficient welding strength.

In the rear spoiler 100 according to the present embodiment, even in the case where the mounting hole 30 is arranged to the curved part around each end, the vicinity of the mounting hole 30 can be welded by vibration welding with a sufficient strength by arranging the discrete-arrangement portion 10 in the vicinity of the mounting hole 30.

This vicinity indicates a distance close enough to assure the strength required to join the inner member 1 and the outer member 2, and is preferably adjacent.

In the example shown in FIG. 4, a mounting portion 31 for arranging the mounting hole 30a therein is formed between the abutment surface 11f and the connecting surface 12f. Therefore, the mounting hole 30a is arranged in the vicinity of the abutment surfaces 11f, 11g, and after vibration welding, the abutment surface 11f and the rib 50f for welding as well as the abutment surface 11g and the rib 50g for welding are welded with a sufficient strength, respectively, as described above.

It is to be noted that a mounting method with respect to the vehicle 200 using the mounting hole 30 may be a method using a bolt and a nut, and may use a well-known clip for mounting. In the light of the mounting strength, workability improvement, and the like, especially the rear spoiler 100 is preferably fixed to the vehicle 200 using arbitrary clips for mounting at predetermined several locations and thereafter fixed using bolts and nuts at other locations.

As a vibration welding device for vibration-welding the inner member 1 and the outer member 2, various types of well-known devices can be used. In the present embodiment, the vibration direction has a single axis and the pressurization direction also has another single axis orthogonal to the vibration direction, thereby allowing usage of a common vibration welding device for general use. As described above, the rear spoiler 100 according to the present embodiment can be welded merely by simple vibration welding with single-axis vibration, so that a stable welding quality can be easily obtained.

At the time of welding by using the vibration welding device, first, the inner member 1 and the outer member 2 are respectively installed on jigs for mounting, provided to the vibration welding device. Thereafter, the vibration welding device brings the jigs for mounting closer in the vertical direction of the device to start pressurization in the pressurization directions P1, P2. When a pressure reaches a predetermined value, the vibration welding device vibrates the inner member 1 and the outer member 2 with preset amplitude.

Then the vibration welding device stops pressurization and vibration at the time when the width in the pressurization direction of the inner member 1 and the outer member 2 is reduced by a preset distance in accordance with melting of the contact surface by vibration. It is preferable that this distance by which the width is to be reduced until when pressurization and vibration are stopped be approximately 1 mm, for example. As described above, by setting the thickness of the welded portions 52 resulting from melting of resin by vibration to be approximately 1 mm, the welded portions can be prevented from becoming too deep and preferred vibration welding can be performed without affecting designability on the outer surface of the outer wall portion 71 of the outer member 2.

As described above, according to the aforementioned embodiment of the present invention, in either of the discrete-arrangement portion 10 and the continuous-arrangement portion 20 within the rear spoiler 100, an angle θ between the tangential plane on each of parts in which the welded portions 52 are to be arranged, and the vibration direction Q falls within 15 degrees ($-15°≤θ≤15°$). Therefore, even with a configuration in which an elongated product such as a spoiler shaped so as to be curved around the end portions in the longitudinal direction is vibration-welded by fitting the inner member 1 into the inner side of the outer member 2 in the thus-curved shape, vibration welding can be performed with a stable welding strength to the product including the curved parts, using a common vibration welding device with single-axis vibration and single-axis pressurization.

Therefore, there is no need for a special vibration welding device for applying pressure and vibration in the plurality of directions, thereby being able to achieve vibration welding at low cost, which provides a stable strength up to the end portions.

Furthermore, the rear spoiler 100 according to the present embodiment is shaped so that vibration welding is performed while the inner member 1 is fitted into the inner side of the outer wall portion 71 folded in a substantially V-shape, and the abutment surfaces 11 in which the welded portions 52 are to be arranged are discretely arranged in the vibration direction in the inner side of the substantially V-shaped outer wall portion 71. Therefore, the welded portions 52 by vibration welding are sterically dispersed and arranged in the inside of the rear spoiler 100 without concentrating on a specific surface.

This provides the rear spoiler 100 having a stable strength enough to resist torsion and deformation during and even after welding.

Furthermore, in the rear spoiler 100 according to the present embodiment, vibration welding is performed while the inner member 1 is fitted into the inner side of the outer member 2, so that the outer surface of the outer wall 71 of the outer member 2 can be made totally free of influence by the vibration welding method.

This enables the rear spoiler 100, which is excellent in design and has a stable strength enough to resist torsion and deformation, to be produced at low cost by vibration welding for general use.

Furthermore, in the rear spoiler 100 according to the present embodiment, the mounting holes 30 for the vehicle 200 are arranged so as to be adjacent to the discrete-arrangement portion 10 or/and the continuous-arrangement portion 20.

Therefore, the inner member 1 and the outer member 2 are configured to be welded with a sufficient welding strength in the vicinities of the mounting holes 30 as well. Especially in the case where the mounting hole 30 is provided in a forwardly-curved part around each end of the rear spoiler 100, a sufficient welding strength can be assured in the vicinity of the mounting hole 30. Therefore, even at the time when the rear spoiler 100 is mounted in use on the vehicle 200, the overall rear spoiler 100 is stably fixed to the vehicle 200 with a sufficient strength.

Furthermore, in the rear spoiler 100 according to the present embodiment, as described above, vibration welding can be easily performed up to the end portions merely by installation into a common vibration welding device with single-axis vibration and single-axis pressurization. This eliminates factors increasing cost, such as welding the end portions separately in additional step or fixing them using another component such as a screw, thereby achieving low cost production.

Second Embodiment

Next, a second embodiment of the present invention is described.

The second embodiment is configured so that, in place of providing the abutment surfaces 11 to the inner member 1 and the ribs 50 for welding to the outer member 2 in the first embodiment described above, the abutment surfaces 11 are provided to the outer member 2 and the ribs 50 for welding are provided to the inner member 1.

The detailed description is omitted with respect to the same configurations to those in the first embodiment described above.

Figure 7:
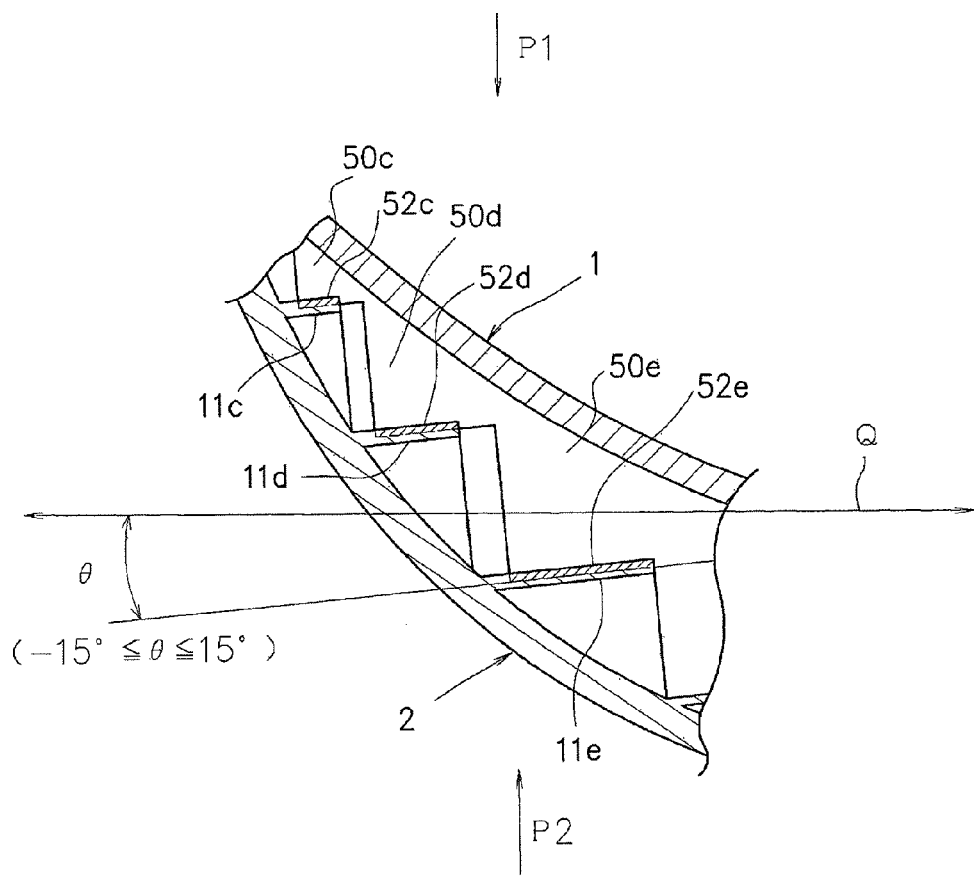
FIG. 7 is a partial cross-section view showing a cross section taken along the line C-C after vibration welding in the second embodiment.

FIG. 7 shows a cross section taken along the line C-C after vibration welding in the second embodiment.

In the discrete-arrangement portion 10 of the rear spoiler 100 as the second embodiment, the abutment surfaces 11 are projectingly provided in a shelf pattern to the inner side of the outer wall 71 within the outer member 2. The abutment surfaces 11 are provided so that an angle θ between the tangential plane in each of points on the surfaces and the vibration direction Q falls within 15 degrees ($-15°≤θ≤15°$).

Providing the abutment surfaces 11 in this manner makes it easy to release a product from a mold at the time of molding, thereby improving the moldability without affecting designability on the outer surface of the outer wall portion 71 within the outer member 2.

Furthermore, the ribs 50 for welding, which are to be welded to the abutment surfaces 11, are provided in locations corresponding to the abutment surfaces 11 within the inner side member 1. Each of the ribs 50 for welding is a flat plate which is arranged substantially in perpendicular to the abutment surfaces 11 in a state where the inner member 1 is fitted into the outer member 2, and the ribs 50 for welding are projectingly provided in a predetermined position of the inner member 1.

With the configuration described above, the inner member 1 is fitted into the outer member 2 that is to be vibration-welded in a state where the abutment distal end portions 51 of the ribs 50 for welding are in contact with the abutment surfaces 11, so that the contact surfaces between the ribs 50 for welding and the abutment surfaces 11 are melted to result in the welded parts 52, in a similar manner to the first embodiment described above.

Therefore, the configuration according to the second embodiment also achieves vibration welding with a sufficient welding strength at the discrete-arrangement portion 10, thereby being able to obtain similar effects to those in the first embodiment described above.

Third Embodiment

Next, a third embodiment of the present invention is described.

The third embodiment is configured so that, in place of welding the inner member 1 and the outer member 2 by vibration welding in the first and second embodiments described above, two outer members 3, 4 are welded by vibration welding. The detailed description is omitted with respect to the same configurations to those in the first and second embodiments described above.

Figure 8:
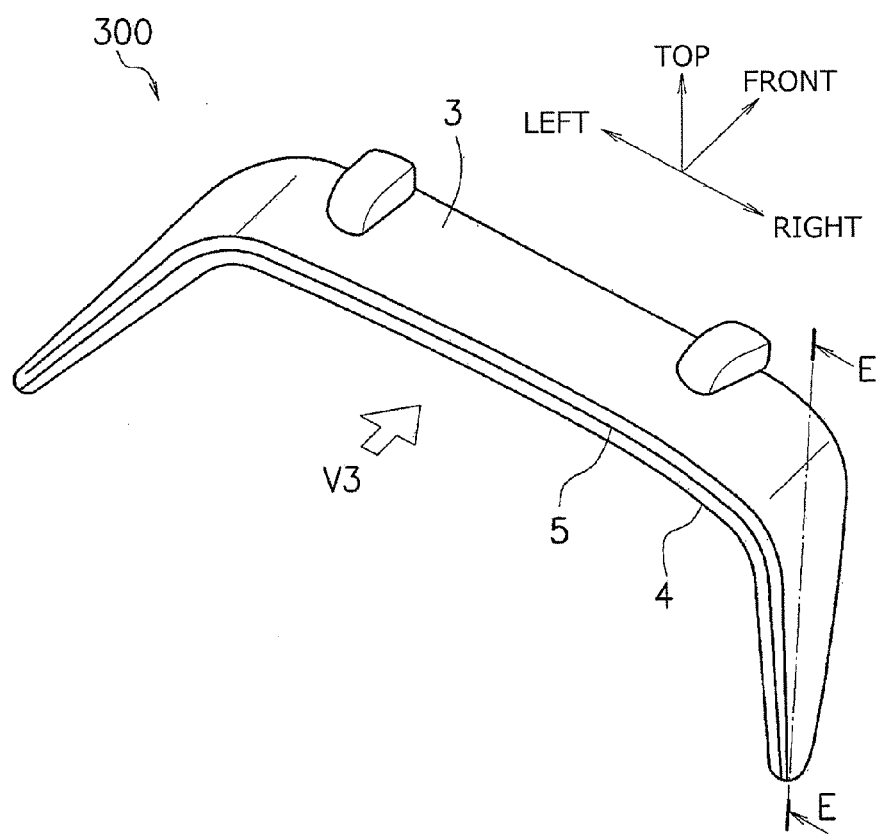
FIG. 8 is a perspective view showing a rear spoiler 300 as a third embodiment.
Figure 9:
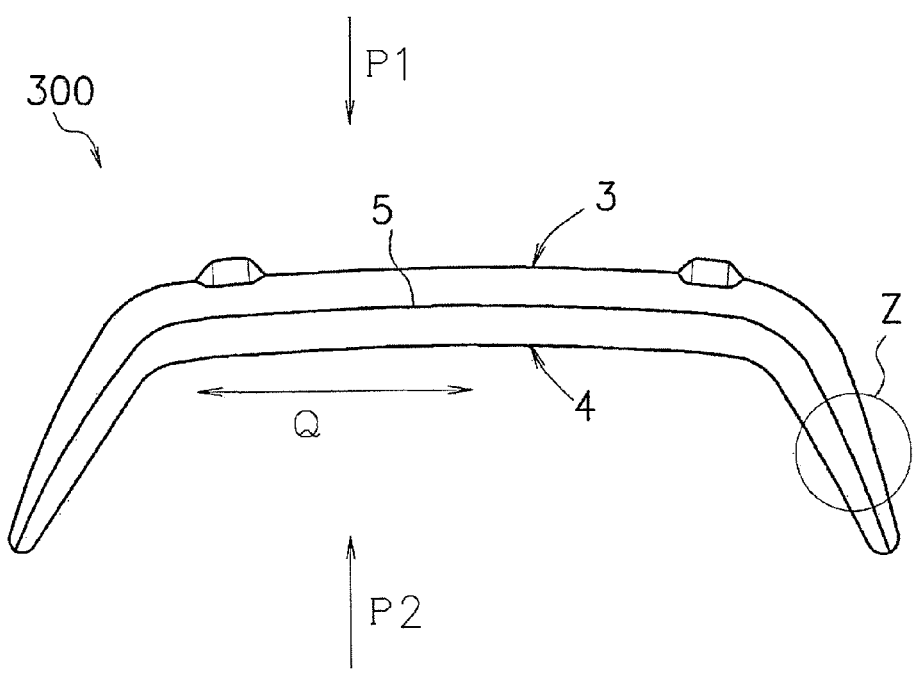
FIG. 9 is a view of the rear spoiler 300 as the third embodiment as viewed in a direction V3.

FIG. 8 shows a rear spoiler 300 as the third embodiment. FIG. 9 is a view of the rear spoiler 300 as viewed in a direction V3. Hereinafter, in a similar manner to the first embodiment described above, a vertical direction and a horizontal direction are explained on the basis of a vehicle traveling direction.

The rear spoiler 300 as the third embodiment is mounted on the rear side of the vehicle 200 and shaped so as to be curved in a downward direction around the both ends in the longitudinal direction. Furthermore, an upper member 3 and a lower member 4 both making up the outer member are formed by being welded by vibration welding.

The upper member 3 is shaped so as to be curved in the downward direction around the both ends, and the lower member 4 is vibration-welded upon being fitted from the downside into the inner side of the upper member 3 in the aforementioned curved shape.

In a similar manner to the first and second embodiments described above, the discrete-arrangement portion 10 and the continuous-arrangement portion 20 are provided in the inner side of the upper member 3 and the lower member 4. In the discrete-arrangement portion 10 at the inner side of the upper member 3 and the lower member 4, the abutment surfaces 11 are provided to one side and the ribs 50 for welding are provided to the other side, respectively. As described above in the first and second embodiments, the present embodiment can be realized in a similar manner regardless of which side the abutment surfaces 11 and the ribs 50 for welding are provided in.

Figure 10:
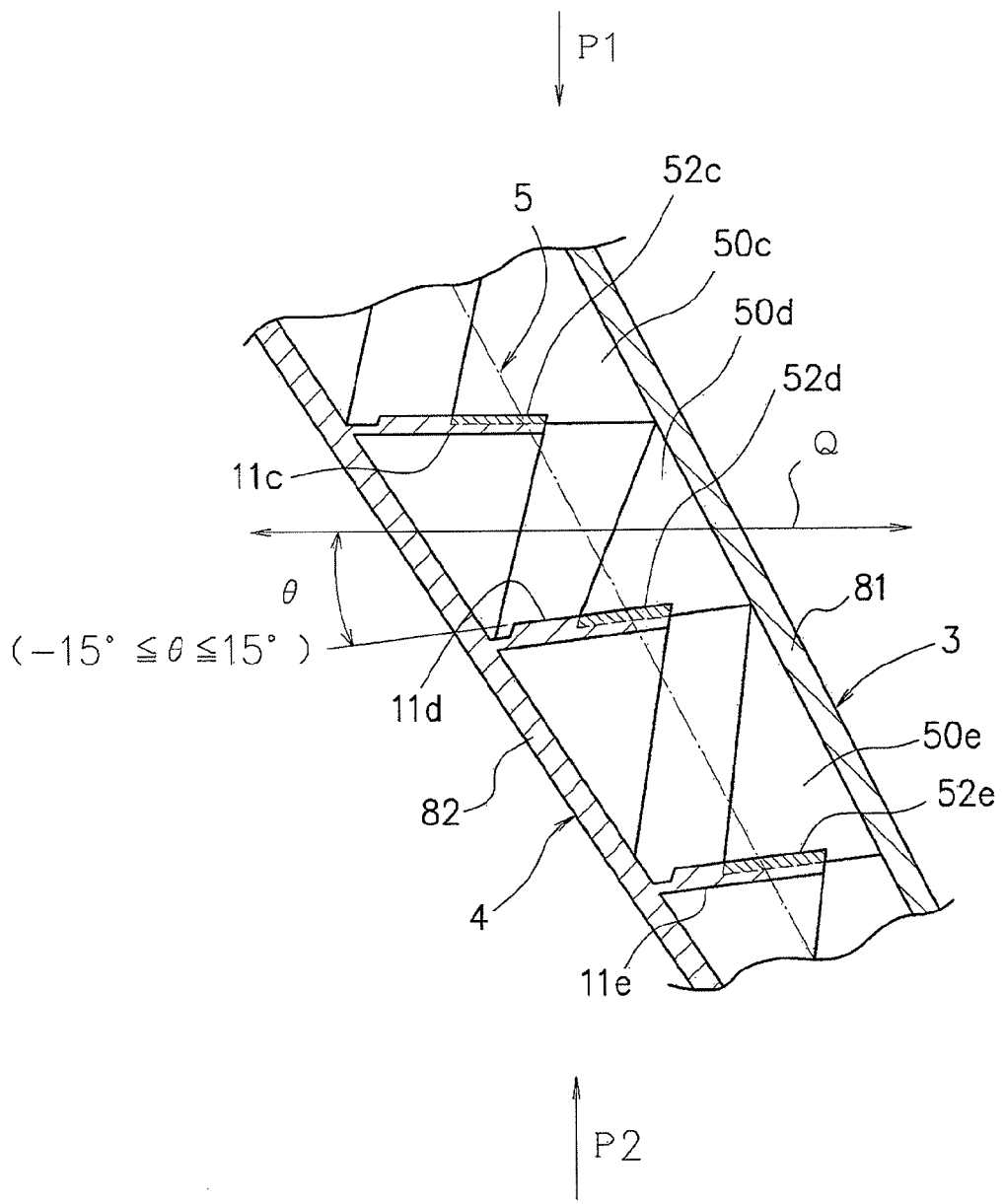
FIG. 10 is a partial cross-section view showing a cross section of a portion Z of FIG. 9 in a direction E-E of FIG. 8.

FIG. 10 shows a partial cross-section view of a portion Z of FIG. 9 in a direction E-E of FIG. 8. In the example shown in FIG. 10, the ribs 50 for welding are projectingly provided in the inner side of the upper member 3 while the abutment surfaces 11 are projectingly provided in the inner side the lower member 4.

In the rear spoiler 300 of the third embodiment, both the upper member 3 and the lower member 4, which are to be vibration-welded, are outer members, thereby requiring designability on the outer surface of outer wall portions 81, 82. Therefore, in order to improve the moldability, the abutment surfaces 11 are projectingly provided in a shelf pattern in a similar manner to the second embodiment described above. The abutment surfaces 11 are provided so that an angle θ between the tangential plane in each of points on the surfaces and the vibration direction Q falls within 15 degrees ($-15° \leq \theta \leq 15°$).

The configuration example shown in FIG. 10 illustrates a case where the abutment surfaces 11 are projectingly provided in a shelf pattern at the inner side of the outer wall portion 82 within the lower member 4.

Further, the ribs 50 for welding, which are to be welded to the abutment surfaces 11, are provided in locations within the upper member 3, corresponding to the abutment surfaces 11. Each of the ribs 50 for welding is a flat plate which is arranged substantially in perpendicular to the abutment surfaces 11 in a state where the lower member 4 is fitted into the upper member 3 from its downside, and the ribs 50 for welding are projectingly provided in a predetermined position in the outer wall portion 81 of the upper member 3.

With the configuration described above, the lower member 4 is fitted into the upper member 3 from its downside to be vibration-welded in a state where the abutment distal end portions 51 of the ribs 50 for welding are in contact with the abutment surfaces 11, so that the contact surfaces between the ribs 50 for welding and the abutment surfaces 11 are melted to result in the welded parts 52, in a similar manner to the first and second embodiments described above.

Therefore, the configuration according to the third embodiment also achieves vibration welding with a sufficient welding strength at the discrete-arrangement portion 10, thereby being able to obtain similar effects to those in the first and second embodiments described above.

Fourth Embodiment

Next, a fourth embodiment of the present invention is described.

The fourth embodiment is configured so that, in place of arranging the abutment surfaces 11 into the inner side of the outer wall portion in the third embodiment described above, the abutment surfaces 11 are arranged in the outer wall portion.

The detailed description is omitted with respect to the same configurations to those in the third embodiment described above.

FIG. 11(A) shows a partial cross-section view of the portion Z of FIG. 9 as the fourth embodiment, in the direction E-E of FIG. 8. FIG. 11(B) shows a cross section taken along the line F-F.

In the discrete-arrangement portion 10 of the rear spoiler 300 of the fourth embodiment, the discrete-arrangement portion 10 similar to that in the first embodiment described above is provided in a contact surface between an outer wall portion 81 of the upper member 3 and an outer wall portion 82 of the lower member 4. In the contact part between the outer wall portions 81, 82, the abutment surfaces 11 are provided to one side and the ribs 50 for welding are provided to the other side, respectively. It is to be noted that the present embodiment can be realized in a similar manner regardless of which side the abutment surfaces 11 and the ribs 50 for welding are provided in.

In order not to affect designability on the upper member 3 and the lower member 4, the abutment surfaces 11 and the ribs 50 for welding are arranged in a position slightly displaced in an upward direction or a downward direction from a partition line 5 between the outer wall 81 of the upper member 3 and the outer wall portion 82 of the lower member 4, as shown in FIGS. 11(A) and 11(B). Arranging in this manner prevents the welded portions made up of the abutment surfaces 11 and the ribs 50 for welding from being viewed at the partition line 5.

Furthermore, the abutment surfaces 11 are provided in the contact surface between the outer wall portion 81 of the upper member 3 and the outer wall portion 82 of the lower member 4, thereby being formed in a staircase pattern in a similar manner to the first embodiment described above. The abutment surfaces 11 are provided so that an angle θ between the tangential plane in each of points on the surfaces and the vibration direction Q falls within 15 degrees (−15°≤θ≤15°).

Figure 11:
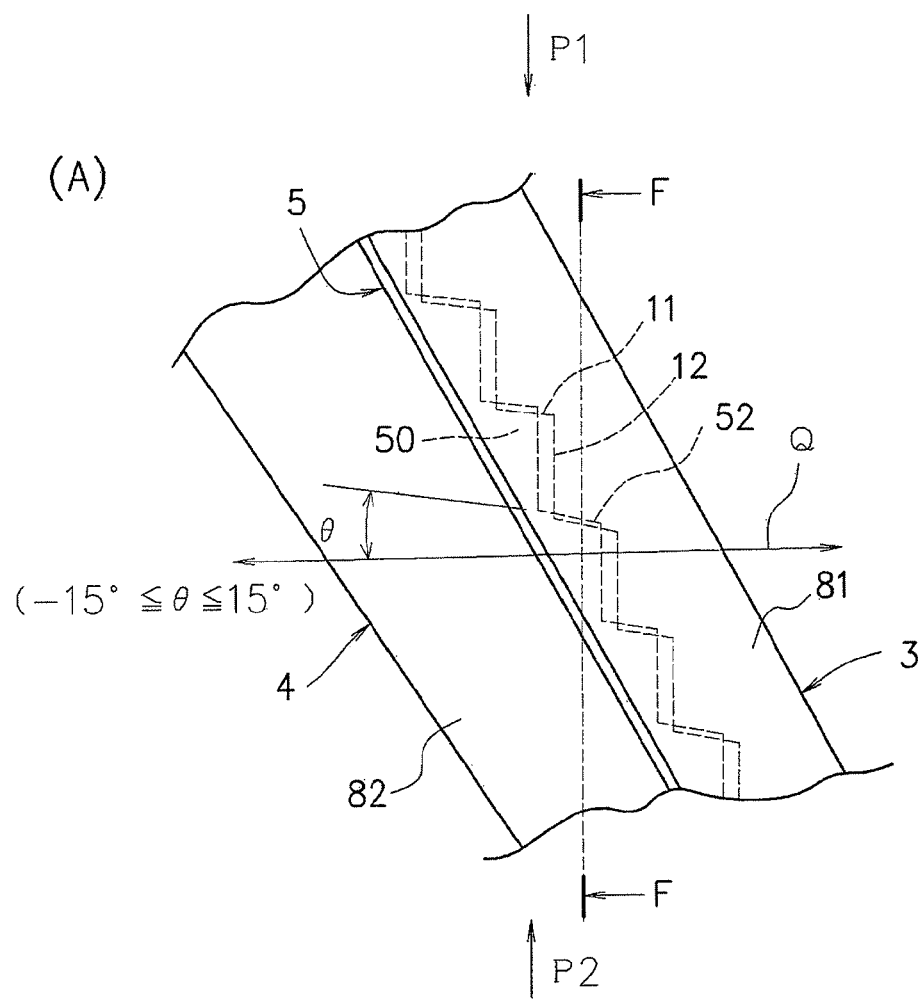
FIG. 11(A) is a cross-section view showing a cross section of the portion Z of FIG. 9 as a fourth embodiment, in the direction E-E of FIG. 8.
FIG. 11(B) is a partial cross-section view showing a cross section taken along the line F-F.
Figure 11:
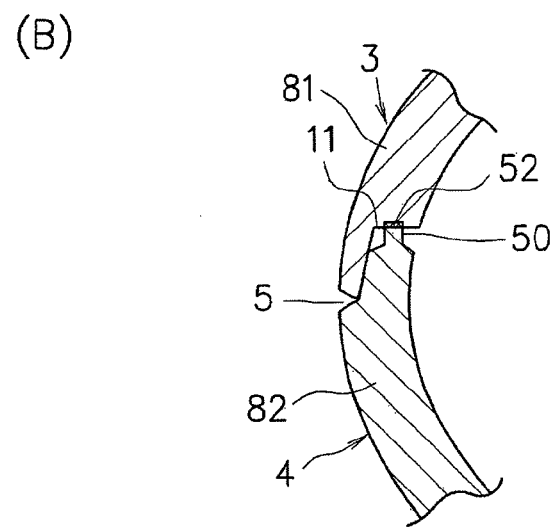

The configuration example shown in FIG. 11 shows a case where the abutment surfaces 11 are provided in a staircase pattern to the outer wall portion 81 within the upper member 3.

Furthermore, the ribs 50 for welding, which are to be welded to the abutment surfaces 11, are projectingly provided to locations within the lower member 4, corresponding to the abutment surfaces 11. Each of the ribs 50 for welding is a flat plate which is arranged substantially in perpendicular to the abutment surfaces 11 in a state where the lower member 4 is fitted into the upper member 3 from its downside, and the ribs 50 for welding are projectingly provided in a predetermined position in the outer wall portion 82 within the lower member 4.

With a configuration described above, the lower member 4 is fitted into the upper member 3 from its downside to be vibration-welded in a state where the abutment distal end portions 51 of the ribs 50 for welding are in contact with the abutment surfaces 11, so that the contact surfaces between the ribs 50 for welding and the abutment surfaces 11 are melted to result in the welded parts 52, in a similar manner to the aforementioned first to third embodiments.

Therefore, the configuration according to the fourth embodiment also achieves vibration welding with a sufficient welding strength at the discrete-arrangement portion 10, thereby being able to obtain similar effects to those in the third embodiment described above.

Regarding Each Embodiment

It is to be noted that each of the embodiments described above is a preferred embodiment of the present invention. Without limitation thereto, the present invention can be implemented by variously changing based on technical ideas of the present invention.

For example, it was explained that the abutment surfaces 11, in which the welded portions are arranged, are provided so that a plurality of surfaces 11a, 11b are discretely arranged in the vibration direction. However, these discretely-provided abutment surfaces 11 may be configured so as to be arranged in the direction perpendicular to the vibration direction as well in accordance with a shape or design of the overall rear spoiler.

Figure 12:
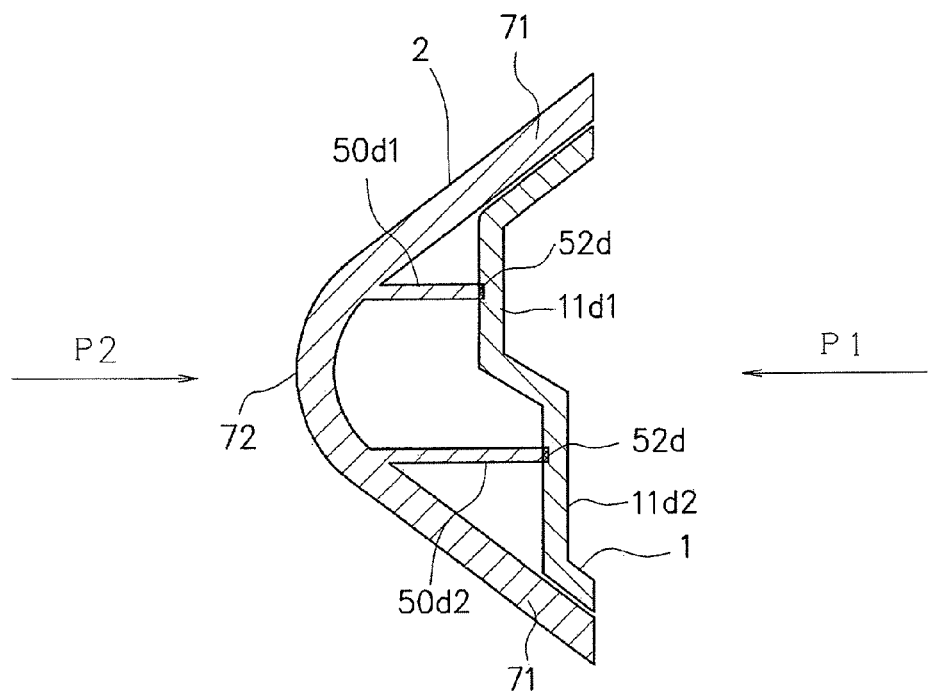
FIG. 12 is a view showing an example in which a plurality of abutment surfaces 11 are arranged in a direction perpendicular to the vibration direction.
Figure 13:
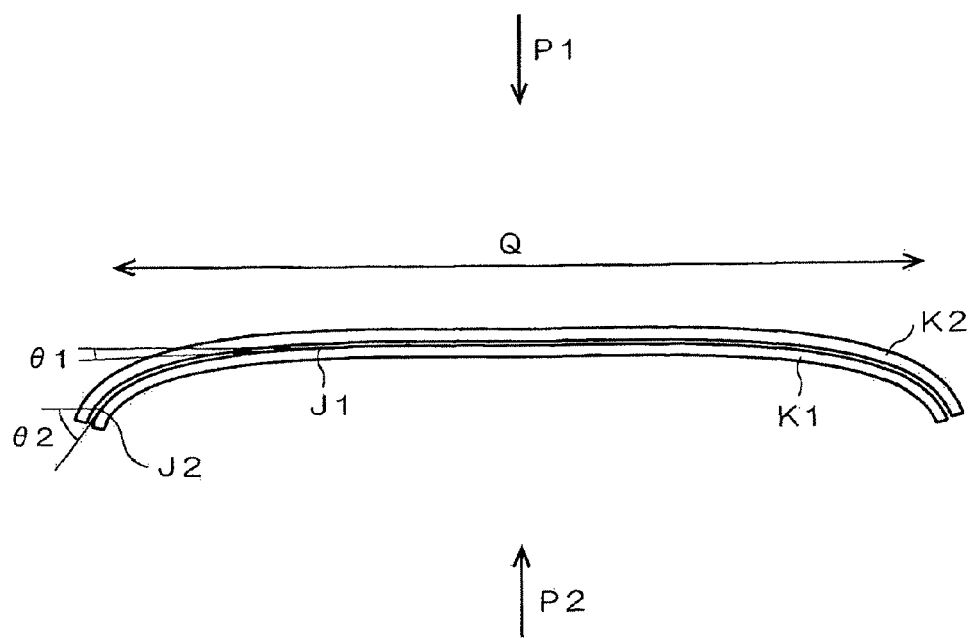
FIG. 13 is a view for illustrating a conventional vibration welding.

For example, when explanation is made using as an example the configuration of the first embodiment described above, it may be configured that while the plurality of abutment surfaces 11 (11a, 11b, . . . ) are discretely arranged in the vibration direction as shown in FIG. 12, abutment surfaces 11d1, 11d2 are arranged in the direction perpendicular to the vibration direction as well. In such a case, ribs 50d1, 50d2 for welding are provided in corresponding locations in the outer member 2, so that a welded portion 52d is formed by vibration welding. Even with such a configuration, each of the embodiments described above can be realized in a similar manner, thereby being able to obtain similar effects.

Furthermore, it was explained that the abutment surfaces 11 are provided in a staircase pattern or a shelf pattern in accordance with moldability at the time of resin molding. However, as long an angle θ between the tangential plane in each of points on the surfaces and the vibration direction Q is provided so as to fall within 15 degrees (−15°≤θ≤15°), a fixture form with respect to the outer wall surface may be arbitrarily determined.

Furthermore, in each of the embodiments described above, it was explained that the continuous-arrangement portion 20 is arranged around the center portion in the longitudinal direction while the discrete-arrangement portion 10 is arranged around each end. However, without limitation to this arrangement, the discrete-arrangement portion 10 and the continuous-arrangement portion 20 may be arranged arbitrarily in accordance with a shape of the resin product for a vehicle in the vibration direction. For example, the continuous-arrangement portion 20 and the discrete-arrangement portion 10 may be configured so as to be alternately provided in the vibration direction.

Furthermore, in each of the embodiments described above, it was explained that two resin members are welded by vibration welding. However, they are not limited to this configuration as long as vibration welding is performable, and for example, it may be configured so that the inner member 1 or the lower member 4 is divided into a plurality of members. That is, it may be configured that the inner member 1 divided into plural pieces is vibration-welded upon being fitted into the inner side of the outer member 2, or the lower member 4 divided into plural pieces is vibration-welded upon being fitted into the inner side of the upper member 3.

Even with a configuration described above, welding can be performed by vibration welding in a similar manner, so that the present invention can be achieved in a similar manner.

Furthermore, even with a configuration in which these members are arranged in a pressurization direction at the time of vibration welding, as long as welding is performable by vibration welding, an arbitrary configuration may be acceptable. That is, for example, even with a configuration in which the inner member 1 divided into two layers in the pressurization direction is vibration-welded upon being fitted into the outer member, as long as vibration welding is performable between respective members, for example, by performing vibration welding after fixing by some method a member positioned in the middle in the pressurization direction.

Furthermore, the present invention was explained as a rear spoiler in each of the embodiments described above. However, it is not limited to the rear spoiler and can be applied in a similar manner to an air spoiler at each region, such as a front spoiler. Yet further, it is not limited to the air spoiler and can be also applied in a similar manner to various types of aero parts, vehicle exterior parts, vehicle interior parts, and the like.

Furthermore, even in the case of having a configuration in which another arbitrary component such as an LED for a stop lamp is built in, the present invention can be applied in a similar manner. In such a case, the product can be produced by, e.g., a method in which a shape having a hole for inserting another component therein is formed to thereby insert another component in the hole after vibration welding.

What is claimed is:

1. A resin product for a vehicle, comprising a plurality of members welded by vibration welding,
wherein welded parts by the vibration welding are arranged in a plurality of different surfaces discretely provided in a vibration direction, and
one of the plurality of surfaces faces in a direction perpendicular to the vibration direction with a tolerance of 15 degrees to the vibration direction.

2. The resin product according to claim 1,
wherein the vibration direction is one direction in a longitudinal direction of the resin product for the vehicle, and
a pressurization direction in the vibration welding is a direction orthogonal to the vibration direction.

3. The resin product according to claim 1, wherein at least one mounting portion with respect to the vehicle is provided adjacent the plurality of different surfaces or between respective surfaces in the plurality of surfaces.

4. The resin product according to claim 1,
wherein the plurality of members to be welded by the vibration welding has an outer member and an inner member,
the outer member includes an outer wall portion that is shaped so that a cross section perpendicular to the vibration direction is folded on a folding portion, and
the inner member is shaped so that a cross-sectional surface perpendicular to the vibration direction is fitted into an inner side of the folded outer wall portion.

5. The resin product according to claim 1, wherein each of the plurality of members is curved in a longitudinal direction to conform with a rear end portion of the vehicle.

* * * * *